(12) United States Patent
Iwama et al.

(10) Patent No.: US 8,965,887 B2
(45) Date of Patent: *Feb. 24, 2015

(54) SOFTWARE SYSTEM TEST CASE CREATION

(71) Applicant: International Business Machines Corporation, Armonk, NY (US)

(72) Inventors: Futoshi Iwama, Yokohama (JP); Ken Mizuno, Tokyo (JP); Taiga Nakamura, Takatsu Kawasaki (JP); Hironori Takeuchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/664,815

(22) Filed: Oct. 31, 2012

(65) Prior Publication Data
US 2014/0109054 A1 Apr. 17, 2014

Related U.S. Application Data

(63) Continuation of application No. 13/653,438, filed on Oct. 17, 2012.

(51) Int. Cl.
*G06F 17/30* (2006.01)
(52) U.S. Cl.
USPC .......................................................... 707/729

(58) Field of Classification Search
USPC .......................................................... 707/726
See application file for complete search history.

(56) References Cited

U.S. PATENT DOCUMENTS

| 8,612,487 | B2 * | 12/2013 | Hui et al. | 707/802 |
| 8,639,727 | B2 * | 1/2014 | Hui et al. | 707/802 |
| 2004/0024868 | A1 * | 2/2004 | Drummond, II | 709/224 |
| 2013/0060814 | A1 * | 3/2013 | Hui et al. | 707/802 |
| 2013/0060816 | A1 * | 3/2013 | Hui et al. | 707/802 |

FOREIGN PATENT DOCUMENTS

| JP | 2001337846 | 12/2001 |
| JP | 7105828 | 11/2005 |
| JP | 2005332098 | 12/2005 |
| JP | 2006059108 | 3/2006 |
| JP | 2007102475 | 4/2007 |
| JP | 2008009825 | 1/2008 |
| JP | 2008210275 | 9/2008 |
| JP | 2009163609 | 7/2009 |

* cited by examiner

*Primary Examiner* — Baoquoc N To
(74) *Attorney, Agent, or Firm* — Cantor Colburn LLP; Vazken Alexanian

(57) ABSTRACT

A test case generation method includes in a processor, extracting descriptions from document artifacts, extracting a first set of keywords from the descriptions, categorizing the descriptions to a first set and a second set, extracting a second set of keywords that occur in the second set and generating a test case from the second set of keywords.

17 Claims, 2 Drawing Sheets

SOFTWARE SYSTEM TEST CASE CREATION

CROSS REFERENCE TO RELATED APPLICATIONS

This application is a continuation of U.S. patent application Ser. No. 13/653,438 filed Oct. 17, 2012, the contents of which are incorporated herein by reference thereto.

BACKGROUND

The present invention relates to software test cases, and more specifically, to systems and methods for creating test cases for software systems for behaviors that may be overlooked by the system specification.

Currently, any software system is subject to test cases that define the correct behavior before the software system is shipped to the client. Test engineers typically know the system's behavior when they execute the test cases. Preparation of the test cases is based on prior knowledge of the system and/or specifications of the system. In test case creation, the test engineers extract the behaviors of the system to understand dependencies between system attributes and any invalid combinations of values in the system. Systems can include exceptional (or special) behaviors that do not necessarily reveal themselves from the prior knowledge of the system and/or specifications of the system. However, the exceptional behaviors need to be characterized in test cases as well. These exceptional behaviors are often spread out among documents created separately from the system specification, and often the exceptional behaviors are not documented. As such, exceptional behaviors are typically not determined from existing test cases.

SUMMARY

Exemplary embodiments include a test case generation method, including in a processor, extracting descriptions from document artifacts, extracting a first set of keywords from the descriptions, categorizing the descriptions to a first set and a second set, extracting a second set of keywords that occur in the second set and generating a test case from the second set of keywords.

Further exemplary embodiments include a test case generation method, including in a processor, extracting descriptions from document artifacts, the descriptions including a first subset of descriptions that cannot be understood correctly, and a second subset of other ordinary descriptions, extracting, via a morphological analyzer, a first set of keywords including conjunctions and verbs from the descriptions, constructing as document categorizer, categorizing, via the document categorizer, the descriptions to a first set and a second set, extracting a second set of keywords including nouns that occur in the second set, generating a test case from the second set of keywords and outputting descriptions that are not understood.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
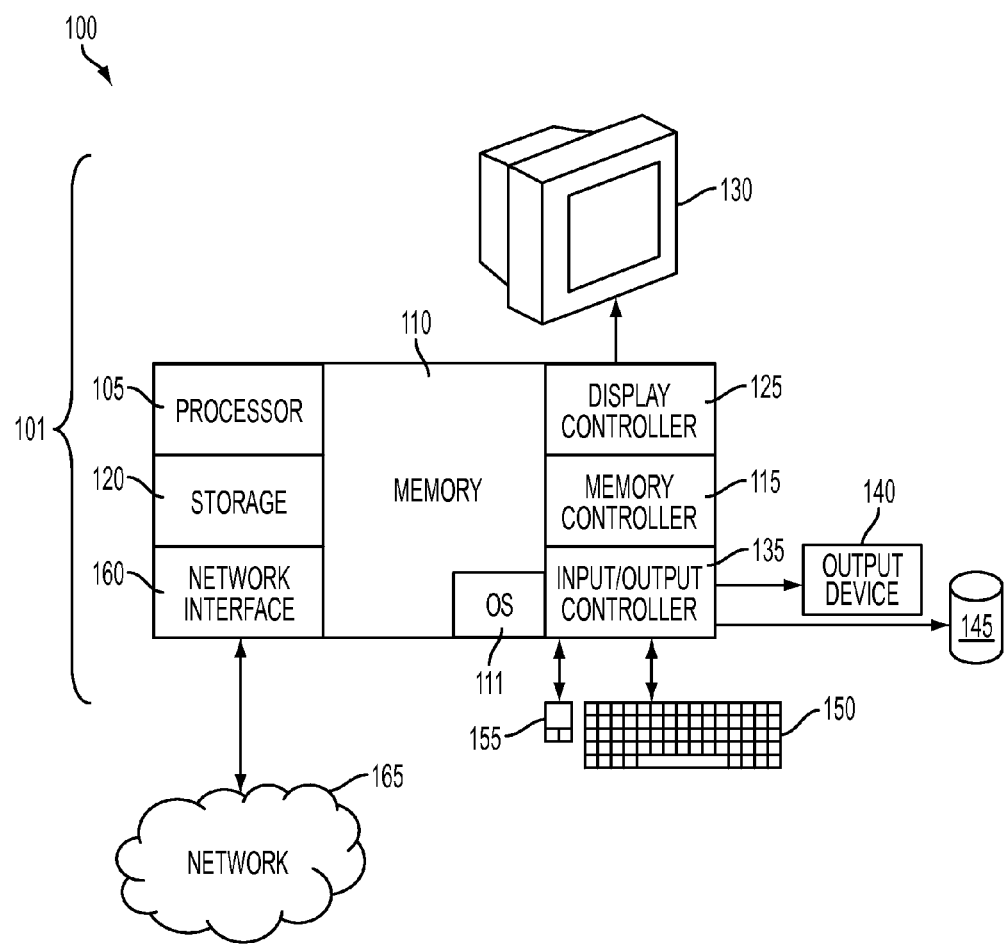
FIG. 1 illustrates an exemplary embodiment of a system that can be implemented for the test generation methods described herein.

In exemplary embodiments, the systems and methods described herein extract descriptions of exceptional behaviors from system specifications and related documents to create test cases for the overall software system as well as for the exceptional behaviors of the software system. As described herein, currently by using the provided syntactic patterns, certain descriptions are not necessarily related to the exceptional behavior. For example, the software system specification may include a conditional clause in which one of more choices, say A or B can be selected. As such, the user can start installation of the software system when the user clicks the execution button, which is not an exceptional behavior. However, when the user selects a recommendation mode, the parameter A or B can be selected, one or more of which is an exceptional behavior. When the user wants to cancel, the user can select a cancel button, which is not an exceptional behavior. However, one of the selected parameters A or B may have included an exceptional behavior that was not recorded. As such, some of the configurations may not be working and since they were not selected, no message is displayed when user executes the function in the first time, thereby concealing the exceptional behavior.

In exemplary embodiments, the systems and methods described herein extract descriptions in the specification documents that are important for testing but are typically not noticed by engineers. Such descriptions are considered those that readers cannot understand correctly because of ambiguities, such as not being familiar with the type of behavior that exceeds what is disclosed in the system specification. The system and methods described herein therefore extract the descriptions and place them into a category by a machine learning method. It can be appreciated that currently training data cannot therefore be created for the exceptional cases in each application area of the software system. In addition, in document categorization, noun keywords are used as the features. But the noun keywords in the specification documents are application domain specific, and there are few noun keywords used across different domains. As a result, the performance of the document categorization with noun keywords used for this purpose is not high. In exemplary embodiments, terms are extracted from categorized descriptions to identify terms with few frequencies appearing only in the categorized descriptions. From the extracted descriptions, test engineers select the descriptions that are not used in the current user defined test cases and extend the test case for the exceptional behaviors. Existing test creation techniques can be implemented to create test cases for the exceptional cases. The systems and methods described herein further extract keywords that appear only in the descriptions which readers cannot understand correctly because of ambiguities. A key word that appears only in description that is difficult for a reader to understand because the ambiguity is also extracted. The systems and methods described herein then insert the descriptions that contained extracted keyword into the test case generation system. Descriptions containing the extracted key word are inputted into a test case generation apparatus as a complementary input.

It will be appreciated that any suitable computing system can be implemented to execute the methods described herein. FIG. 1 illustrates an exemplary embodiment of a system 100 that can be implemented for the test generation methods described herein. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the test case generation methods described herein in accordance with exemplary embodiments and a suitable operating system (OS) 111. The OS 111 essentially controls the execution of other computer programs, such the test case generation systems and methods as described herein, and provides scheduling, input-output control, file and data management, memory management, and communication control and related services.

The test case generation methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the test case generation methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The test case generation methods described herein and the OS 111, in whole or in part, but typically the latter, are read by the processor 105, perhaps buffered within the processor 105, and then executed.

When the systems and methods described herein are implemented in software, as is shown in FIG. 1, the methods can be stored on any computer readable medium, such as storage 120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the test case generation methods are implemented in hardware, the test case generation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
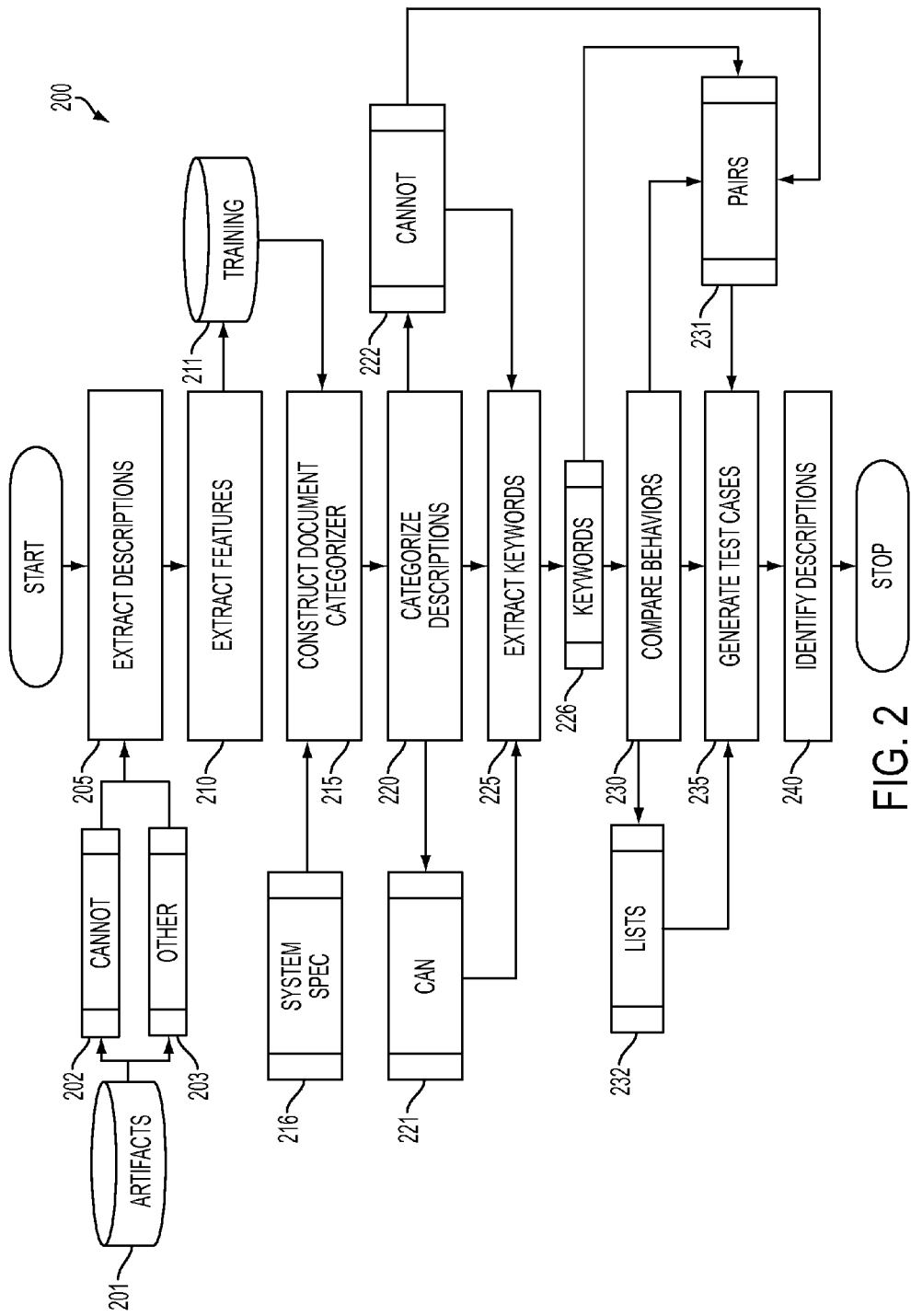
FIG. 2 illustrates a flowchart of a method for test case generation in accordance with exemplary embodiments.

FIG. 2 illustrates a flowchart of a method 200 for test case generation in accordance with exemplary embodiments. As described herein, the method 100 contemplates exceptional behaviors from system specifications and related documents to create test cases for the overall software system as well as for the exceptional behaviors of the software system.

At block 205, the system 100 extracts descriptions of existing document artifact specifications, from a database 201. For example, the database 201 can include different written accounts from various engineers of unusual behaviors of the subject software system. From the database, the system 100 extracts a subset 202 of descriptions that cannot be understood correctly, and a subset 203 of other normal descriptions. As such, the subset 202 includes descriptions that are complex and hard to be understood. For example the subset 202 can be existing documents from old projects. The subset 203 includes ordinary descriptions. Both subsets 202, 203 are taken out of an existing written specification database 201 as input data for learning as described further herein.

At block 210, the system 100 extracts features (e.g., keywords) by implementing an existing morphological analyzer, which explores all possible solutions to a multi-dimensional, non-quantified complex problem working backwards from the output towards the system internals. In exemplary embodiments, the system 100 extracts verbs and conjunctions (not nouns at this point) from both subsets 202, 203. The amount/extent of characteristic features is extracted by using morphological analysis. The extracted features (e.g., the verbs and conjunctions) are all stored into training data 211. As described above, the subsets 202, 203 are extracted and analyzed for training data 211.

At block 215, the system 100 constructs a document categorizer from training data 211. The software specifications 216 are also input into the document categorizer at block 215.

At block 220, the system 100 categorizes descriptions into those descriptions 221 that can be understood, and those descriptions 222 that cannot be understood. In exemplary embodiments, for all the input documents described above, the document categorizer sets N=the number of descriptions. Classification processing or ranking processing is performed on a target written specification (the number of descriptions: N) to extract the descriptions 222 that are complex and hard to be understood. In addition, the document categorized sets M=the number of descriptions 222.

At block 225, the system 100 extracts keywords 226 (i.e., nouns) that only appear in the descriptions 222. In exemplary embodiments, the number of nouns related to descriptions that are hard to understand and occur frequently in the descriptions 222 are extracted. In exemplary embodiments, for each noun_i, the system 100 identifies the frequency in the whole input documents=fn_i, and the frequency in the descriptions 222, =fm_i. A score, r_i, is defined as:

$$r\_i = fm\_i * fm\_i/fn\_i$$

The system 100 calculates r_i for a given noun_i when a ratio fm_i/fn_i is larger than a pre-determined threshold (e.g., fm_i/fn_i=0.5). The system 100 then sorts the keywords 226 by the score r_i and selects the keywords with a relative high score (e.g., 25 keywords). Using the score, the system 100 extracts a subset of the descriptions 222 that contain the high score keywords.

At block 230, the system 100 compares the subset of descriptions 222 that are paired with the high score keywords (i.e., pairs 231) with a lists 232 of the subject system's behaviors based on the engineer's domain knowledge. Any differences in the compared behaviors are inserted into an existing test generation system at block 235, where test cases are generated. In exemplary embodiments, the differences can be manually input. From the test case generation system, the test cases with high coverage/quality are generated. The test case generation system generates a test case with great comprehensiveness/completeness based on the pairs 231.

At block 240, the system identifies the description that testers cannot understand correctly from the list of system's behaviors based on the engineer's domain knowledge and outputs those descriptions for review. Descriptions that are difficult for a person conducting a test to understand are taken out of behavior descriptions enumerated/created manually and are outputted as descriptions that are to be used for judgment review. In particular, the amount of characteristic of description that is hard to be understood is extracted by using a method that is not dependent on a specific field (e.g., verb-and-conjunction approach). The extracted amount of characteristic is applied to a target document to obtain a key word. A test case is generated from descriptions containing the key word. It can be appreciated that the method 200 is iterative and can be run numerous times to focus the test cases based on a previous iteration of the method 200.

In an example, a test engineer generates test cases for a Blu-ray recorder. Any artifacts are entered from the database 201 and the existing specification for the Blu-ray recorder is entered at 216. The lists 232 of the systems behaviors based on the engineers domain knowledge may include: 1) When select [HDD (hard disk drive)] and click the record button, the TV recording starts; 2) When select [BD (Blu-ray burner)] and click the record button, the TV recording starts; 3) When click the one-touch button, the TV program of the selected channel is recorded; and 4) When the recording capacity is not enough, a message will pop-up in the setting or the recording plans. It can be appreciated that this is just a short list of examples illustrative of what can be included in the lists 232. The keywords 226 that can be extracted at block 225 can include by way of non-limiting example: Reference; BD; overwrite; heart; GB; TB; AVC; capacity; deletion; HDD; registration; disk; use; transmission; CH; detail; PM; Blu-ray; TV; Minato; high-definition; broadcasting; hours; sport; one-touch; and high-priority.

As such, examples of descriptions (e.g., the descriptions 222) and corresponding test cases generated from block 235 can include by way of non-limiting example:

TABLE 1

| Description In Specification Documents | Test Case |
| --- | --- |
| When select [BD], [one-touch transmission] is not active | BD–>one-touch transmission = not available |
| Overwrite Mode (only when [HDD] is selected as the destination to record) | Only when destination to record = HDD–> overwrite mode = available |
| In the setting for recording of serial TV programs, the recording will be done correctly when the broadcasting hours are changed. | Broadcasting hours are changed –> reading can be done. |
| In the recording setting using network, the corresponding TV program will not be recorded when its priority is not set to high-priority. | Priority! = high-priority –> Network recording setting does not work |

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A test case generation method, comprising:
   in a processor:
   extracting descriptions from document artifacts;
   extracting a first set of keywords from the descriptions;
   categorizing the descriptions to a first set and a second set;
   extracting a second set of keywords that occur in the second set, wherein the second set of keywords are nouns;
   generating a test case from the second set of keywords; and
   generating a first frequency for each extracted noun in the descriptions and a second frequency for each extracted noun in the second set.

2. The method as claimed in claim 1 wherein the descriptions include complex descriptions.

3. The method as claimed in claim 1 wherein the descriptions include ordinary descriptions.

4. The method as claimed in claim 1 wherein the first set of keywords includes conjunctions and verbs.

5. The method as claimed in claim 4 wherein the first set of keywords is extracted via morphological analysis.

6. The method as claimed in claim 1 further comprising calculating a score for each extracted noun responsive to a ratio if the first frequency to the second frequency exceeding a predetermined threshold.

7. A test case generation method, comprising:
   in a processor:
   extracting descriptions from document artifacts;
   extracting a first set of keywords from the descriptions;
   categorizing the descriptions to a first set and a second set;
   extracting a second set of keywords that occur in the second set, wherein the second set of keywords are nouns;
   generating a test case from the second set of keywords; and
   generating a score for each extracted noun.

8. The method as claimed in claim 7 further comprising pairing the score with the second set.

9. The method as claimed in claim 8 further comprising comparing the pairing of the score with the second set to a list of system behaviors.

10. The method as claimed in claim 9 wherein the test cases are generated by comparing differences between the pairing of the score with the second set and the list of system behaviors.

11. The method as claimed in claim 1 further comprising outputting descriptions that are not understood.

12. A test case generation method, comprising:
    in a processor:
    extracting descriptions from document artifacts, the descriptions including a first subset of descriptions that cannot be understood correctly, and a second subset of other ordinary descriptions;
    extracting, via a morphological analyzer, a first set of keywords including conjunctions and verbs from the descriptions;
    constructing as document categorizer;
    categorizing, via the document categorizer, the descriptions to a first set and a second set;
    extracting a second set of keywords including nouns that occur in the second set;
    generating a test case from the second set of keywords;
    outputting descriptions that are not understood; and
    generating a first frequency for each extracted noun in the descriptions and a second frequency for each extracted noun in the second set.

13. The method as claimed in claim 12 further comprising calculating a score for each extracted noun responsive to a ratio if the first frequency to the second frequency exceeding a predetermined threshold.

14. A test case generation method, comprising:
    in a processor:
    extracting descriptions from document artifacts, the descriptions including a first subset of descriptions that cannot be understood correctly, and a second subset of other ordinary descriptions;
    extracting, via a morphological analyzer, a first set of keywords including conjunctions and verbs from the descriptions;
    constructing as document categorizer;
    categorizing, via the document categorizer, the descriptions to a first set and a second set;
    extracting a second set of keywords including nouns that occur in the second set;
    generating a test case from the second set of keywords;
    outputting descriptions that are not understood; and
    generating a score for each extracted noun.

15. The method as claimed in claim 14 further comprising pairing the score with the second set.

16. The method as claimed in claim 15 further comprising comparing the pairing of the score with the second set to a list of system behaviors.

17. The method as claimed in claim 16 wherein the test cases are generated by comparing differences between the pairing of the score with the second set and the list of system behaviors.

* * * * *